United States Patent [19]

Cobb

[11] Patent Number: 5,333,461
[45] Date of Patent: Aug. 2, 1994

[54] LIQUID TRAP FOR GASEOUS OR LIQUID PHASE MATERIALS

[76] Inventor: Douglas A. Cobb, Box 128, Great Falls, Va. 22066

[21] Appl. No.: 981,253

[22] Filed: Nov. 25, 1992

[51] Int. Cl.⁵ .................. F25J 3/00; F25B 47/00; F25B 45/00
[52] U.S. Cl. .................................... 62/11; 62/9; 62/12; 62/20; 62/77; 62/85; 62/306; 62/529
[58] Field of Search .................. 62/9, 11, 12, 20, 77, 62/306, 529, 85

[56] References Cited

U.S. PATENT DOCUMENTS

| | | | |
|---|---|---|---|
| 2,983,105 | 5/1961 | Armond | 62/529 |
| 3,721,097 | 3/1973 | Briley et al. | 62/11 |
| 4,133,663 | 1/1979 | Skinner | 62/18 |
| 4,150,494 | 4/1979 | Rothchild | 34/27 |
| 4,350,018 | 9/1982 | Frank et al. | 62/54 |
| 4,420,317 | 12/1983 | Stewart | 62/20 |
| 4,424,680 | 1/1984 | Rothchild | 62/48 |
| 4,607,489 | 8/1986 | Krongold | 62/306 X |
| 4,639,262 | 1/1987 | Heichberger | 62/11 |
| 4,761,961 | 8/1988 | Marx | 62/77 X |
| 4,766,733 | 8/1988 | Schuderi | 62/77 |
| 4,996,848 | 3/1991 | Nelson et al. | 62/77 |
| 5,101,637 | 4/1992 | Daily | 62/77 X |
| 5,150,576 | 9/1992 | Minzenberger | 62/11 |
| 5,201,918 | 4/1993 | Vobach | 62/20 X |

FOREIGN PATENT DOCUMENTS

| | | | |
|---|---|---|---|
| 1152431 | 5/1962 | Fed. Rep. of Germany | 62/9 |
| 2008704 | 9/1971 | Fed. Rep. of Germany | 62/9 |
| 972110 | 10/1964 | United Kingdom | 62/9 |

Primary Examiner—Henry A. Bennett
Assistant Examiner—C. Kilner
Attorney, Agent, or Firm—Whitham, Curtis & Whitham

[57] ABSTRACT

A collection vessel and method of collecting gaseous and liquid phase collectible materials utilizes introduction of the collectible material directly into a liquid cryogenic material to provide complete condensation and a liquid-filled trap for collected gases within the liquid cryogenic material. This trap effectively eliminates escape of collected gases even though evaporated cryogenic materials may be vented and the collection vessel operated at atmospheric pressure. The performance of the vessel is thus improved and no freezing of the collected gases occurs at the inlet due to the warming of the inlet structure by the material being collected. Therefore, the collection of gases may be done at high speed and with simplified equipment. Completeness of condensation is assured by the use of a baffle of a preferably collapsible construction for retaining gases within the liquid cryogenic material until condensation is complete. A preferred embodiment of the invention includes a structure for forming a liquid trap within a vessel with a tube and a collapsible baffle and does not require any modification of an existing vessel suitable for handling liquid cryogenic materials. Recycling of collected materials, such as Freon ™ refrigerants is also enhanced since contaminants will also be partially separated by freezing within the collection vessel and selective distillation can be done as the vessel is allowed to warm to ambient temperature.

21 Claims, 2 Drawing Sheets

LIQUID TRAP FOR GASEOUS OR LIQUID PHASE MATERIALS

CROSS-REFERENCE TO RELATED APPLICATIONS

This application is related to concurrently filed U.S. patent application Ser. No. 07/981,271, entitled COLLECTION VESSEL FOR GASEOUS OR LIQUID PHASE MATERIALS, by Douglas A. Cobb, which is fully incorporated by reference herein.

BACKGROUND OF THE INVENTION

1. Field of the Invention

The present invention generally relates to the collection of gaseous or liquid phase materials and, more particularly, to the trapping of refrigerant fluids when removed from refrigeration or air-conditioning systems while preventing venting of the refrigerant materials to the atmosphere.

2. Description of the Prior Art

Refrigeration systems, including heat pumps and air-conditioning systems have been in widespread use in the United States and other countries for many years. These systems, which provide for heat transfer between heat exchangers by alternately compressing (e.g. condensing) and decompressing (e.g. evaporating) a refrigerant fluid, are generally quite reliable and will operate with minimal service for periods of several years at a time. However, when service is required, the entire system must have the refrigerant removed before service can be performed.

In the past, it was often the practice to simply vent the refrigerant to the atmosphere, which could be done in a very short time by simply cutting or otherwise opening a tube in which the refrigerant was carried. More recently, however, it has been discovered that this practice represents a substantial environmental hazard. Specifically, most common refrigerant materials, notably chlorinated fluorocarbons (CFC's) such as Freon TM, are believed to catalyze the destruction of ozone molecules in the atmosphere and may otherwise react with other atmospheric gases, as well.

Ozone concentrations in the atmosphere are of particular concern since ozone reduces the transmission of the ultraviolet (UV) portion of sunlight to the earth's surface and depletion of ozone has thus been linked to increased incidence of skin cancer in humans in recent years. The action of CFC's is particularly severe since it appears to catalyze reactions of ozone rather than directly reacting therewith. These CFC molecules are generally quite stable and it has been theorized that a single molecule of a CFC propellant or refrigerant may catalyze the decomposition of ten thousand molecules of ozone or perhaps many times that number.

CFC materials have also been used as propellants in aerosol dispensers. Such use is now forbidden in the United States and some other countries, but use as propellants still continues in many parts of the world. Therefore, in circumstances where collection of CFC's is possible, it is critically important that collection be complete and venting of CFC's into the atmosphere eliminated.

Accordingly, in recent years, numerous arrangements have been proposed and used in practice to collect refrigerant materials from refrigeration systems. However, these systems often allow a percentage of the refrigerant to escape into the atmosphere. Since some refrigeration systems are quite large, even small percentages of escaping refrigerant can represent quite substantial amounts of refrigerant material. Also, for some small systems such as in a home refrigerator or an automobile, the percentage of refrigerant which escapes is often much larger since the tubes for connection of any refrigerant collection system (and from which refrigerant cannot be collected in prior arrangements) represent a comparatively large volume.

Further, these collection arrangements are inherently quite slow when used properly to minimize escape of refrigerant, causing a 300% increase in the time required for performing service on a refrigeration system. For example, in servicing of an air conditioning system, a collection system is typically connected to the refrigeration system at service valves provided therein. When these service valves are opened, the refrigerant, if above atmospheric pressure, will flow spontaneously to the collection vessel. Thereafter, pumping of the refrigerant is done to pressurize the refrigerant in the collection vessel and to draw a partial vacuum in the refrigeration system in order to extract the refrigerant. This pumping process is slow and requires specially designed pumps since in the latter stages of the operation, the pump is operating to pump material from a substantial level of vacuum to a relatively high pressure. A fairly high degree of vacuum is required by regulation at the present time (10 inches of mercury, soon to be increased to 20 inches of mercury). Nevertheless, some refrigerant remains in the refrigeration system and in the tubes between the pump and the collection vessel. This refrigerant is then lost to the atmosphere.

Additionally, the collection vessels must not be overfilled since the degree to which a collection vessel may be safely filled is a function of the pressures it is designed to withstand. Therefore, refrigerant in overfilled collection vessels will not be purchased for recycling since overfilled vessels present the danger of an explosion. Thus, collection of refrigerant from a large system requires monitoring of the amount of collected material by trained personnel and periodic stopping of the collection process and substitution of collection vessels. Additional refrigerant is lost to the atmosphere at each change of collection vessels since they must be disconnected from the collection system while the connection tubing is filled with pressurized refrigerant.

Air-conditioning systems are also known which operate at less than one atmosphere pressure using so-called Freon R 113 TM, which is a liquid at room temperature and atmospheric pressure. Collection of refrigerant from this type of system relies on passing gases, containing the refrigerant, in the vapor state, from a tank into a water-cooled heat exchanger in which any vapor phase refrigerant is theoretically condensed and flows back under the influence of gravity to the tank while uncondensed gases are vented. However, such flow is impeded by the gas flow and a portion of the refrigerant may again be evaporated. Therefore, it is estimated that the portion of refrigerant which escapes to the atmosphere may be as high as 10% to 20% of the portion collected by this apparatus.

This system, which relies on condensation of the refrigerant at a temperature only slightly below the boiling point of the refrigerant, also requires several hours to process the contents of a moderate sized refrigeration system. Such an extended period of time, during which the system must be operated by skilled personnel increases the cost of service to the refrigeration system. Further, it reduces the number of units which can be serviced by such personnel by about two-thirds compared to the prior practice (e.g. two units instead of six units per day) when the refrigerant was merely vented to the atmosphere. Therefore, there is a substantial pecuniary incentive to use the apparatus improperly, resulting in increased amounts of refrigerant released into the atmosphere. Such improper use of the apparatus and the deleterious effects of such improper use are the direct result of reliance on a heat exchanger which is open to the atmosphere to condense all refrigerant in the gases passed therethrough. Clearly, if gases are passed too rapidly through the heat exchanger, complete condensation cannot take place. Further, if the flow rate of such gases is further increased, the flow of gases may counteract the counter flow of condensed refrigerant or even cause liquified refrigerant to be re-evaporated and/or ejected from the heat exchanger. At the present time, there are no feasible or effective safeguards against improper operation of this type of collection apparatus and only a separate detector of the refrigerant material would be able to determine whether or not refrigerant was, in fact, being vented. The provision of such a detector would be of marginal value since the collection apparatus, even if properly operated, is incapable of collecting all of the refrigerant. The amount of refrigerant allowed to escape might be reduced to low concentration levels by low flow rate and yet permit a substantial quantity of refrigerant to escape over a period of time. In short, the present state of the art imposes a trade-off between the rate of refrigerant collection and the amount of refrigerant which is allowed to escape into the atmosphere. The limitations of current collection equipment effectively encourage faster collection rates with the result of greatly increased amounts of released refrigerant.

It has been found by the inventor that the above described apparatus can be made to function more efficiently by reducing the temperature at which the heat exchanger is made to operate. However, complete collection of refrigerant is still not achieved. Other low temperature and cryogenic gas collection arrangements are also known in the art such as are disclosed in U.S. Pat. Nos. 4,150,494 and 4,424,680 to Rothschild. However, a major concern in the operation of such systems is the prevention of freezing of the condensible gas as it is introduced into the vicinity of the cryogenic material. Such freezing may entirely block flow of the condensible gas and halt the collection process. The only alternative in such a case is to substitute collection apparatus and to continue the process with the substituted apparatus; a time consuming and apparatus intensive option which also causes some release of material to be collected. Accordingly, the rate of collection of gases and the proximity of the collected gas and the cryogenic material, such as liquid nitrogen, is carefully controlled in much the same manner as with the heat exchanging condenser in the system described above. In fact, arrangements such as passing the collected gases over the surface of the cryogenic material (as in U.S. Pat No. 4,150,494 to Rothschild) or spraying a liquid cryogenic material into a stream of gas to be collected (as in U.S. Pat. No. 4,424,680 to Rothschild) are merely different forms of heat exchanging condensers. Either of these arrangements only improve upon the efficiency of the above described apparatus by virtue of the lower available temperature at which the heat exchange takes place. Both rely on regulation of the flow rate of the gas to be collected and neither provides any selective barrier to the escape of gases to be collected or inherent safeguard against the misuse of the collection apparatus.

As further background, at the present time, refrigerants are collected in the field using portable tanks containing air. The refrigerant is mixed with the air in the container as the refrigerant is pumped or displaced from the refrigeration system and is thus contaminated. Apparatus used to transfer refrigerant from the collection containers to a larger tank, either in the field or at a refrigerant recycling facility presents a further opportunity for loss of refrigerant to the atmosphere. Therefore, there are several points in the present collection process where refrigerant is likely to be vented to the atmosphere.

SUMMARY OF THE INVENTION

It is therefore an object of the present invention to provide a system for collection of CFC's which provides a selective physical barrier to the introduction of collected CFC's into the atmosphere.

It is another object of the present invention to provide a collections system for gases which can collect gases rapidly and without escape of the gases collected; the performance of which allows for high speed of gas collection.

It is a further object of the invention to provide a collection vessel for gases which may be operated at atmospheric pressure while providing a liquid-filled trap for the collected gases.

In order to accomplish these and other objects of the invention, a method of collecting a liquid or gaseous phase material including the steps of introducing liquid or gaseous phase material into liquid cryogenic material within an enclosure, evaporating a portion of the liquid cryogenic material while at least liquefying the liquid or gaseous phase material, and venting evaporated cryogenic material.

In accordance with another aspect of the invention, a refrigerant collection system including an enclosure including an arrangement for introducing a collectible material into the enclosure and for venting contents of said enclosure, and a condensing arrangement including a collapsible baffle for condensing said refrigerant within said enclosure at a temperature at or below 32° F.

In accordance with a further aspect of the invention, an apparatus is provided for forming a liquid filled trap within a vessel having an opening in an upper portion thereof and charged with a low temperature liquid material, said apparatus including a tube fitted with a bushing for engaging said opening, said tube having a length sufficient to reach below an upper surface of the low temperature liquid material when the bushing engages the opening, and at least one collapsible baffle mounted on a lower portion of the tube.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
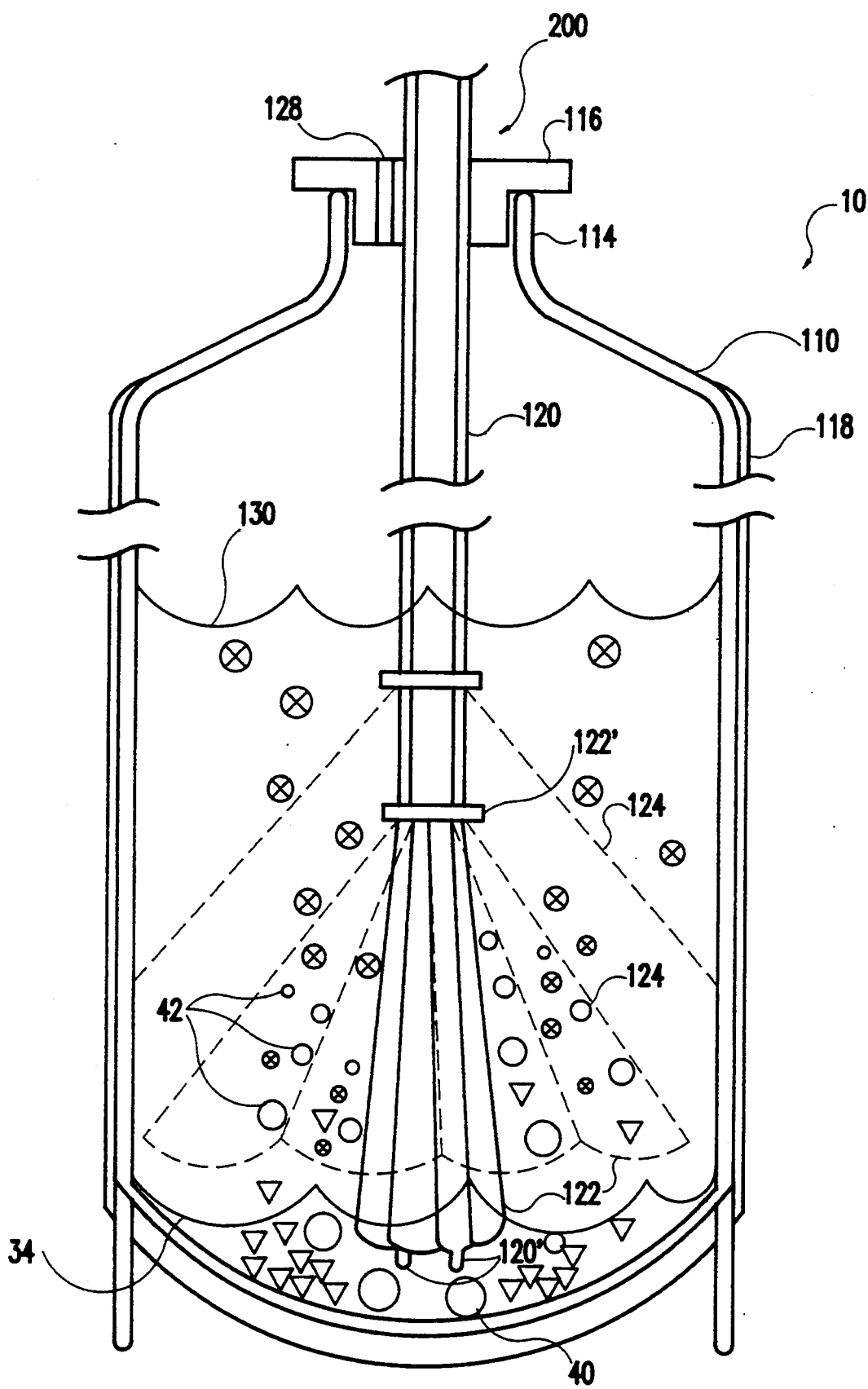
FIG. 1 is a cross-sectional view of a preferred form of collection vessel and trap apparatus in accordance with the invention.

Referring now to the drawings, and more particularly to FIG. 1, there is shown, in a cross-sectional view, a gas collection or trap vessel 10 in accordance with a preferred form of the invention through which an understanding of the principles of the invention may be easily conveyed. Collection vessel 10 is preferably a standard so-called Dewar flask container of a type generally used to transport liquid nitrogen or other liquid cryogenic materials. The shape and configuration of the body 110 of such vessels is otherwise relatively unimportant to the practice of the invention. However, it is preferable that some form of insulation of the exterior of the vessel, such as a double wall construction (not shown), coating 118 or both be provided to reduce heat exchange with the ambient atmosphere and other effects such as condensation or possible injury to personnel by skin contact with surfaces cooled to temperatures below that of the freezing point of moisture in or on the skin. It is also preferable that, as is usual in vessels made for the purpose of handling and transporting of liquid cryogenic materials, that the neck portion 114 of the vessel provide a relatively wide opening.

It is also to be understood that the principles of the invention are generally applicable to other fluids at reduced temperatures (e.g. at or below 32° F., such as, for example, salt water near its freezing point), in which case the structure of the collection or trap vessel is of even less consequence. However, the performance of the system, apparatus and method of the invention is very much enhanced when cryogenic materials, such as liquid nitrogen, are employed to reduce temperatures to a those at which solidification of the collected fluids will take place.

In connection with such a vessel, the refrigerant trap in accordance with the invention may be embodied as an extremely simple and low-cost device. To form the refrigerant trap, all that is necessary is to provide a tube 120, preferably of flexible rubber or plastic (for self-insulation) compatible with cryogenic temperatures, fitted with a bushing 116 of a size to fit loosely within opening 114 and so positioned along the tube 120 to locate a lower end 120' thereof in close proximity (e.g. approximately the diameter of tube 120) to the bottom of the vessel body 110. A vent 128 may be provided or evaporated cryogenic material may simply be allowed to escape through the loose fit. It is preferred, however, to provide an arrangement which can maintain a slight vacuum within vessel body 110 for purging connection lines. Flanges, as illustrated, are suitable for this purpose, particularly if a resilient washer or coating is provided. Alternatively, a stopper-shaped bushing could be provided.

Preferably, one or more collapsible baffles 124, each comprised of a plurality of leaves 122 are also provided along the lower half of tube 120. These collapsible baffles serve to assure that full condensation or solidification of refrigerant will occur below the surface of the liquid cryogenic material. The collapsing feature allows the collapsible baffle to be inserted into the vessel through opening 114 and thereafter to expand to generally downwardly convex (e.g. conical) form in positions indicated by dashed lines 124. The final form of the expanded collapsible baffle is not critical to the practice of the invention. Since these baffles are for the purpose of containing gaseous phase refrigerant until it is fully condensed and may also briefly contain evaporated cryogenic material, some buoyancy of the assembly may result. However, this effect is generally self-limiting and may be advantageous in regard to ease of withdrawal of the trap apparatus from the vessel 10 as the lower portions of the vessel become filled with solidified refrigerant material.

The leaves 122 of these collapsible baffles are preferably formed of aluminum, which does not become brittle at cryogenic temperatures as do most other common metals. The leaves 122 should be slightly curved to be concave downwardly or inwardly toward tube 120 and have a transverse dimension which is somewhat less than the diameter of opening 114. The preferred overlapping of leaves 122 provides for a close fit therebetween for good gas containment and structural stability of baffle 124. The number of leaves 122 forming each baffle should be such as to cause the sum of the widths of all blades to equal or slightly exceed the internal diameter of the vessel body 110. The length of the blades 122 should be about 1.5 times the internal radius of the vessel to maintain a relatively steep angle when expanded. A steep angle provides for collapsing of the baffle with little force when tube 120 is withdrawn from the vessel. The blades 122 are preferably pivotably suspended from collar 122' and spring loaded to expand outwardly. The details of this suspension and spring loading are not critical to the practice of the invention. Some of the spring loading may be derived from the curvature of leaves 122 since the overlapping tends to increase the curvature when the baffle is collapsed. Alternatively, other mechanisms for opening and closing the collapsible baffle may be employed.

Figure 2:
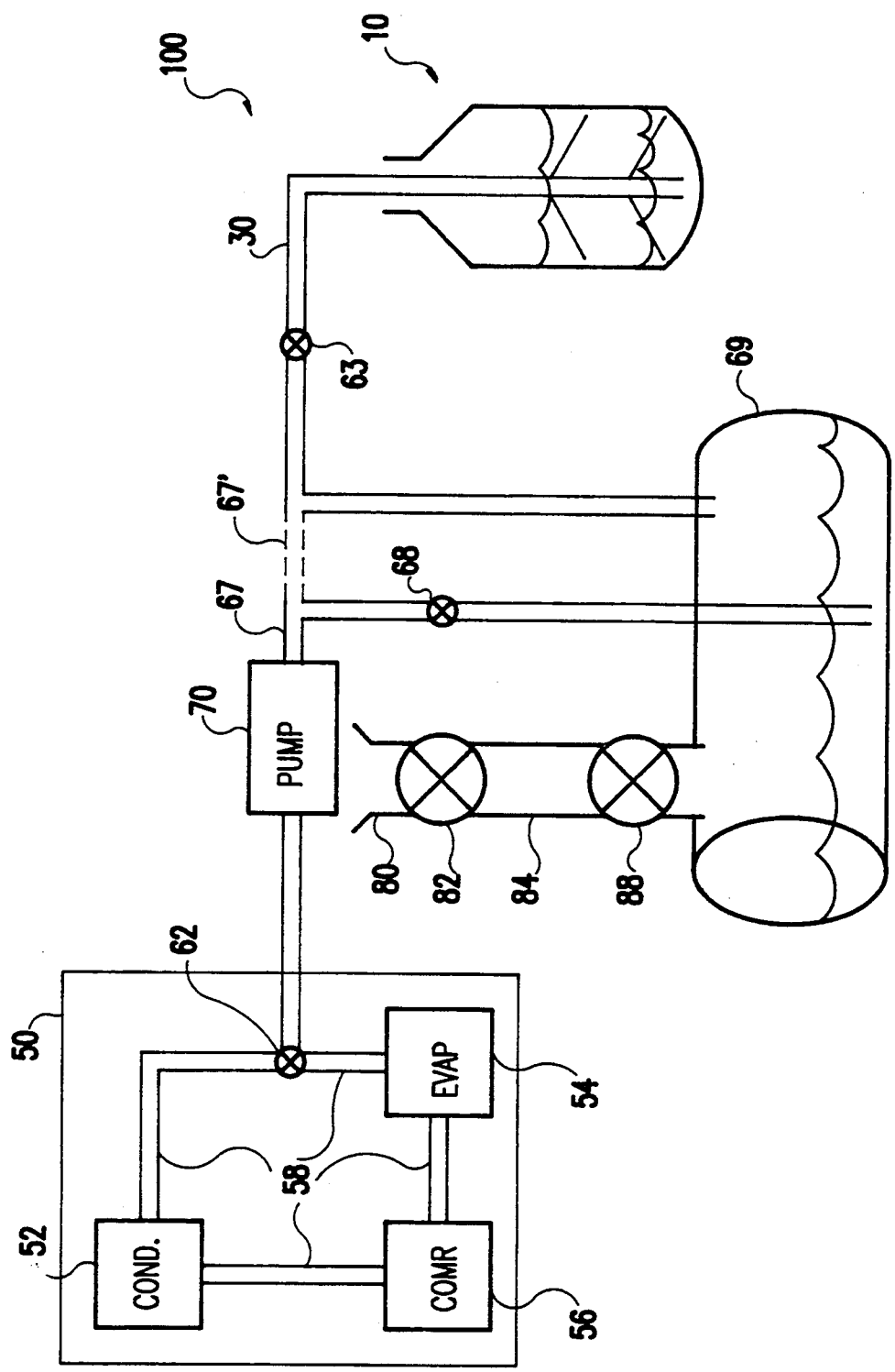
FIG. 2 is a schematic diagram of a gas collection system utilizing the collection vessel and trap apparatus of FIG. 1.

In operation and with reference to FIG. 2, when a gas to be collected is introduced through inlet tube 120, bubbles 40 of refrigerant (or droplets of liquid refrigerant) will form within the liquid nitrogen. The heat exchange at the surface of the bubbles (e.g. the interface of the collected gas and the liquid nitrogen) immediately begins to reduce the volume of the bubbles both through cooling of the collected gas and the condensation thereof, forming droplets of the liquified collected gas. Heat continues to be removed from these droplets until a substantial fraction thereof will solidify. The remainder will simply coalesce as liquid as indicated at 34, pooling in the bottom of the vessel 10. This pool of liquified collected gas may also solidify, depending on the amount of liquid nitrogen available.

A similar process will occur even if the collected material is liquid or mixed gaseous and liquid phase, as collected. Heat exchange will rapidly take place at the interface of the collected material and the liquid cryogenic material. However, in this case, the liquid phase, like the liquified collected gas in the preceding paragraph, will have a greater density than the liquid cryogenic material (and the cryogenic material should be so chosen) and will collect and possibly solidify as indicated at 34 as the liquid cryogenic material is evaporated.

The liquefaction and solidification of the collected gas is typically extremely rapid so that bubbles will usually be fully condensed within the first few inches of travel through the cryogenic liquid. Therefore, it is expected that virtually none of the collected material will reach the surface of the liquid cryogenic material in a gaseous form. To insure this however, it is preferred to provide one or more collapsing baffles 124, as discussed above, which may be of any material having a high rate of heat conduction and transfer and compatible with the cryogenic temperature environment. The collapsing baffle will effectively limit the transit of any bubbles of collected gas through the liquid cryogenic material for a sufficient period of time that complete condensation thereof takes place, as indicated by the diminishing diameters of bubbles 42.

At the same time, the heat transfer to the cryogenic material causes the liquid to evaporate and form new bubbles 44 of evaporated cryogenic material (marked by an "x" therein) which rise through the liquid cryogenic material to the surface thereof and are vented as a gas. While transit of these bubbles of evaporated cryogenic material is also impeded by the baffles 124, these bubbles, of course, do not condense and eventually escape between blades 122 or through apertures therein which may be provided. Again, it should be noted that condensation of collected material is extremely rapid and the baffles need only slow the transit of bubbles through the liquid cryogenic material by a few seconds in order to assure full condensation of the collected material. Little or no mixing of gases takes place since the boiling point of the cryogenic material is chosen to be lower than the boiling point of the collected gas, bubbles of which are indicated as circles having an "x" therein in FIG. 1. Therefore, at the surface of bubbles of the collected gas, both the collected material and the cryogenic material are in a liquid phase. Mixing is somewhat reduced and separation of the liquids will take place both due to the freezing of the collected material (illustrated by triangles in FIG. 1) and due to differences in density of the two liquid materials, assuming they are not mutually soluble. None of the collected gas can remain mixed with the evaporating cryogenic material since the collected gases, possibly including liquid or gaseous phase contaminants such as moisture or lubricants, will be fully condensed.

Other alternatives to a collapsing baffle also exist such as a screen or perforated or shaped baffle within the liquid cryogenic material which would have the effect of reducing the volume of bubbles of collected gas (e.g. increasing the surface area per unit volume) to increase heat transfer and to distribute the bubbles more evenly through the volume of liquid cryogenic material. meshes of closely spaced rods or fibers causing a tortuous path for the bubbles would serve the same function while being relatively insusceptible to clogging by freezing. A floating baffle such as of expanded polystyrene (EPS) could also be used. However, a collapsing baffle is much preferred since it can be easily and rapidly removed from the vessel and will not impede removal of solidified refrigerant from the vessel as will be discussed below. Further, while some alternatives, such as a fiber mesh, could theoretically be installed in and/or removed from an existing vessel, none provides the convenience of a collapsible structure mounted on inlet tube 120.

A high flow rate can be readily maintained when pumping low pressure CFC's, as will be discussed in connection with FIG. 2, since evaporated cryogenic material, particularly if it is a harmless and common gas in the atmosphere, such as nitrogen, can be vented as rapidly as it is produced. Therefore the inlet tube 120 in accordance with the invention can be and preferably is operated at or very near atmospheric pressure plus the minimal hydrostatic pressure of the liquid cryogenic material. The flow rates for the collected gas, utilizing the method and apparatus of the invention, can thus approach the speed at which refrigerant could be vented to the atmosphere. Therefore, in contrast with the prior art, the incentive is toward correct usage of the collection vessel while misuse (e.g. low flow rates which may induce some freezing) is made extremely difficult and of no advantage whatsoever.

No freezing of a degree which causes any significant restriction of inlet tube 120 has been encountered since the collected gas warms the tube. In other words, a high flow rate of collected gases actually enhances the performance of the collection vessel in accordance with the invention and avoids the blocking of the inlet by freezing encountered in the prior art. If low flow rates are found to cause some freezing in specific situations, however, the outside of tube 120 may be insulated from contact with the cryogenic material.

Referring now to FIG. 2 in more detail, the application of the collection vessel and trap apparatus of the invention to a gas or refrigerant fluid collection system 100 and process in accordance with the invention is shown. As an example, refrigeration system 50 is illustrated including a condenser 52, a compressor 56, and an evaporator 54 in a closed loop system connected by tubing 58. A valve 62 is preferably provided for charging the system and collecting refrigerant therefrom. In order to collect the refrigerant from the system, tube 66 is connected to the closed system such as at valve 62. If pumping is to be used, as is generally contemplated, a partial vacuum may be drawn on tube 66 before opening valve 62 which, in turn, allows a partial vacuum to be drawn on the closed system.

It should be noted, as will be discussed in greater detail below, for ease of handling and to avoid interruption of refrigerant collection by the filling of collection vessels 10, it is desirable to use the collection vessel 10 as a trap vessel in connection with a larger collection tank 69. However, collection vessel 10 in accordance with the invention may be used for direct collection of refrigerant, in which case tubing connection 67 would take the form indicated by dashed lines 67', valve 63 and tube 30 and tank 69 and associated structure omitted or bypassed. Operation of the collection system in accordance with the invention is virtually the same in either case except that when the collection vessel 10 is used as a trap vessel in connection with a collection tank 69, trapping of the refrigerant may be deferred until a desired degree of vacuum is drawn on the refrigeration system 50 and the refrigerant removed therefrom as completely as practical or required by regulation. Tank 69 can also act as a reservoir if the pump capacity exceeds the rate at which refrigerant can be delivered to the trap vessel 10 during collection; delivery to the trap vessel 10 being regulated by valve 63. If collection tank 69 is not used, trapping of the refrigerant by the collection vessel will proceed concurrently with pumping refrigerant from the system. Assuming the use of collection tank 69, pump 70 is used to draw a desired degree of partial vacuum on refrigeration system 50 and tubing 66, valves 62, 68 and 63 are open. Gases in tank 69 are vented into the collection or trap vessel 10 where the refrigerant and contaminants are condensed and collected in largely solid form, as described above.

In practice, collecting Freon TM using a trap containing liquid nitrogen as a cryogenic material virtually eliminates venting of refrigerant to the atmosphere. In fact, sensitive apparatus capable of detecting as little as 1 ppm of Freon ™ has been unable to detect any escaping refrigerant using the technique and collecting vessel in accordance with the present invention. Therefore, the invention essentially provides a trap, in the sense of the term as used in the plumbing arts, filled with liquid cryogenic material and which totally prevents escape of refrigerant while allowing extremely fast collection rates. The system allows simplification of the collection process to a point comparable in speed and ease of use with pumping of the refrigerant to the atmosphere and is fully compatible with all collection systems currently in use for the purpose while providing much improved performance thereof.

As an additional benefit of the invention, the freezing and liquefaction of collected materials is also effectively the first stage of a fractional distillation process for recycling of the refrigerant since impurities and contaminants such as lubricants and moisture will be effectively separated from the refrigerant by the freezing process due to their different freezing points. Therefore, the collected refrigerant will require somewhat reduced processing during recycling and could be fractionally distilled upon removal from the collection vessel by regulation of the temperature thereof. Further, the invention provides enhanced safety during collection and transportation of the collected refrigerant due to the cooling by the remaining cryogenic material and the ability to vent evaporated cryogenic material without venting refrigerant. As an additional safety feature if collection vessel 10 is used for transportation of collected materials, overfilling the collection vessels is a substantial impossibility due to the volume of cryogenic material present during collection. The volume of material collected is similar to the volume of liquid nitrogen with which the collection vessel is initially charged and condensation and solidification ceases when the liquid nitrogen is fully evaporated.

It should be noted that the use of collection tank 69 is generally preferred as a matter of convenience and custom in the trade for collection of refrigerant materials which are liquid at room temperature, such as Freon R 113 ™. The use of such a tank avoids the need to monitor temperatures and pressures in numerous smaller collection vessels 10 as well as providing a single system and procedure applicable to refrigeration systems of virtually any size. In such a case, the preferred form of collection vessel 10 shown in FIG. 1 is particularly adapted to existing hardware and the trapping function in conjunction with a larger collection tank as will now be discussed.

For collection of refrigerants which are of gaseous phase at room temperature, the vessel 10, itself, is preferably used for holding and transportation of collected refrigerant. However, in such a case, further cryogenic material should be periodically added to the vessels to maintain the collected materials in its condensed and/or solidified state. Alternatively, transfer of the material to another vessel capable of being closed and maintaining above atmospheric pressure may be done if desired, but preferably through a closed conduit to reduce the likelihood that any collected refrigerant will be vaporized.

It should be noted that the solidified refrigerant at the temperature of liquid nitrogen does not take on a unitary form like water ice but has a thick, slush-like and somewhat granular consistency as a mixture of solid refrigerant particles and liquid nitrogen and can be poured. Therefore, it is possible to return the solidified refrigerant to tank 69 by closing valve 63, withdrawing tube 120 and collapsible baffles 122 from trap vessel body 110 and simply pouring the solidified refrigerant into tank 69. In this regard, it is referable to provide a lock chamber 84 between valves 82 and 88 (all of which preferably have a common, relatively large, internal diameter, nominally two to four inches) to avoid any vaporization of refrigerant during transfer to the collection tank 69. Valve 88 avoids venting of vaporized refrigerant from previous collections. In other words, when it is desired to return the solidified refrigerant to collection tank 69 after trapping, the solidified refrigerant is poured into conduit 80, which is preferably somewhat funnel shaped, and flows through valve 82 into lock chamber 84. Then valve 82 is closed and valve 88 opened to allow the solidified granular contents from the collecting or trap vessel 10 to flow into collecting tank 69. It should be noted that the presence of liquid nitrogen in the mixture minimizes the vaporization of any refrigerant during this process. Any liquid nitrogen introduced into tank 69 serves to cool the contents of the collection tank and to maintain a low temperature as long as the liquid nitrogen remains. This assists in the maintaining of reduced pressure in the collection tank 69.

If the amount of collected refrigerant exceeds the capacity of trap vessel 10, the above process of returning the solidified refrigerant to collecting tank 69 may be repeated a number of times as may be necessary until all collected refrigerant is solidified. However, it is necessary to replenish the liquid nitrogen in the trap vessel with each repetition. This procedure allows a maximum amount of refrigerant to be collected for a given capacity of tank 69. Further, this preferred collection procedure uses a minimum of hardware since only a single trap vessel is required. An additional advantage of this methodology is that if freezing of contaminants blocks tube 120, it is only necessary to close valve 63 and withdraw tube 120 from the trap vessel in order to clear it. Clearing will occur spontaneously as the tube 120 is allowed to warm in the ambient atmosphere. The maximum volume of refrigerant which will be vented during such an event will be limited to the volume of tube 120 if valve 63 is located proximate thereto since the remainder of the collected refrigerant remains trapped below the surface of the liquid nitrogen. As a practical matter, simply raising the tube will often allow sufficient warming to clear the tube, even without withdrawing the lower end of the tube from the vessel 10, thus minimizing loss of refrigerant. Further, freezing is only likely to occur when flow rates are reduced near the completion of the trapping process, at which point the solidified refrigerant can simply be returned to the collection tank 69 and valve 63 opened slightly to purge tube 30 by slight vacuum developed by cooling of collection tank 69 by the liquid nitrogen as the freezing of tube 120 is cleared. This operation also can be accomplished with no loss of refrigerant.

In view of the foregoing, it is seen that the present invention provides a collection vessel and system which provides a selective physical barrier or trap for the collected material. The only restriction on use is that the density of collected and liquified or solidified material must be greater than that of the liquid cryogenic material and that the boiling point of the cryogenic material be slightly lower than that of the collected material. Readily available and environmentally neutral liquid nitrogen satisfies these requirements for most substances of interest. The technique of collection allowed by the present invention will restore full productivity of refrigeration system service personnel and allow service to be provided to customers at much reduced time and cost. Further, the system in accordance with the system is virtually fail-safe and largely incapable of being improperly used in a way which would allow escape of collected materials to the atmosphere. The features of the collection system can also be easily and inexpensively retrofitted in existing vessels of a type which is used for the transportation and containment of cryogenic substances and the structure forming a trap therein may be comprised of a very simple and inexpensive hardware arrangement.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of collecting a liquid or gaseous phase material including the steps of
   introducing said material into liquid cryogenic material within an enclosure,
   evaporting a portion of said liquid cryongenic material while at least condensing said liquid or gaseous phase material to a density greater than that of said liquid cryogenic material, and
   venting evaporated cryogenic material.

2. A method as recited in claim 1, wherein said liquid or gaseous phase material includes contaminant materials, said method including the further step of
   separating said contaminant materials from other collected materials within said liquid cryogenic material.

3. A method as recited in claim 1, including the further step of separating said liquid cryogenic material from said other collected materials.

4. A method as recited in claim 3, wherein said separating step includes a distillation step.

5. A method as recited in claim 2, including the further step of separating said liquid cryogenic materials from said other collected materials.

6. A method as recited in claim 5, wherein at least one said separating steps includes a distillation step.

7. A fluid collection system including
   an enclosure including means for introducing a collectible material into a liquid contained in said enclosure and means for venting contents of said enclosure, and
   condensing means including a collapsible baffle for condensing said collectible material within said enclosure at a temperature at or below 32° F. to a density greater than said liquid.

8. A system as recited in claim 7, wherein said condensing means comprises a liquid cryogenic material.

9. A system as recited in claim 8, wherein said liquid cryogenic material comprises liquid nitrogen.

10. A system as recited in claim 8, wherein said condensing means further includes means for introducing said collectible material into said enclosure at a location below a surface of said liquid cryogenic material.

11. A system as recited in claim 10, wherein said condensing means further includes at least one collapsible baffle.

12. A system as recited in claim 8, wherein said condensing means includes means for solidifying gaseous or liquid phase contaminants mixed with said collectible material.

13. A collection vessel for receiving a gas or liquid phase collectible material including
   a vessel body including means for venting gaseous contents of said collection vessel,
   a liquid cryogenic material in said vessel body, and
   inlet means for introducing said collectible material into said liquid cryogenic material in said vessel body,
   wherein a liquid phase of said collectible material has a greater density than said liquid cryogenic material.

14. A collection vessel as recited in claim 13, wherein said inlet means introduces said collectible material into said vessel at a location below a surface of said liquid cryogenic material.

15. A collection vessel as recited in claim 14, including means for fully condensing gaseous collectible materials below said surface of said liquid cryogenic material.

16. A collection vessel as recited in claim 15, wherein said means for fully condensing gaseous collectible materials below said surface of said liquid cryogenic material includes a baffle located within said liquid cryogenic material.

17. A collection vessel as recited in claim 15, wherein said means for fully condensing gaseous collectible materials below said surface of said liquid cryogenic material includes a collapsible baffle.

18. An apparatus for forming a liquid filled trap within a vessel having an opening in an upper portion thereof and charged with a low temperature liquid material, said apparatus including
   a tube fitted with a bushing for engaging said opening, said tube having a length sufficient to reach below an upper surface of said low temperature liquid material when said bushing engages said opening, and
   at least one collapsible baffle mounted on a lower portion of said tube.

19. An apparatus as recited in claim 18, further including a valve for controlling passage of material through said tube.

20. An apparatus as recited in claim 18, wherein said collapsible baffle includes a plurality of spring-loaded leaves, the width of each leaf of said collapsible baffle being less than a transverse dimension of said opening.

21. An apparatus as recited in claim 20, wherein a length of each said leaf of said collapsible baffle is greater than a radius of said vessel.

* * * * *